(12) United States Patent
Marcq

(10) Patent No.: US 9,771,552 B2
(45) Date of Patent: Sep. 26, 2017

(54) FLAVOR SYSTEM AND METHOD FOR MAKING SHERRY WINE LIKE BEVERAGES

(71) Applicant: Altria Client Services Inc., Richmond, VA (US)

(72) Inventor: Pauline Marcq, Richmond, VA (US)

(73) Assignee: Altria Client Services LLC, Richmond, VA (US)

(*) Notice: Subject to any disclaimer, the term of this patent is extended or adjusted under 35 U.S.C. 154(b) by 378 days.

(21) Appl. No.: 14/656,318

(22) Filed: Mar. 12, 2015

(65) Prior Publication Data

US 2015/0259634 A1 Sep. 17, 2015

Related U.S. Application Data

(60) Provisional application No. 61/951,954, filed on Mar. 12, 2014.

(51) Int. Cl.
| | |
|---|---|
| *C12H 3/00* | (2006.01) |
| *C12G 1/06* | (2006.01) |
| *A23L 2/56* | (2006.01) |
| *C12G 3/06* | (2006.01) |

(52) U.S. Cl.
CPC ............... *C12G 1/06* (2013.01); *A23L 2/56* (2013.01); *C12G 3/06* (2013.01)

(58) Field of Classification Search
CPC ............... C12G 1/06; C12G 3/06; A23L 2/56
USPC .................. 426/534, 590, 592, 106
See application file for complete search history.

(56) References Cited

U.S. PATENT DOCUMENTS

| | | | |
|---|---|---|---|
| 3,332,779 A | | 7/1967 | Krabbe et al. |
| 3,798,331 A | | 3/1974 | Bavisotto et al. |
| 3,822,729 A | | 7/1974 | Rochette |
| 3,843,809 A | * | 10/1974 | Luck ................. C12G 3/04 |
| | | | 426/11 |
| 3,908,021 A | | 9/1975 | Rehberger et al. |
| 4,021,580 A | | 5/1977 | Raymond et al. |
| 4,180,589 A | | 12/1979 | Chicoye et al. |
| 4,220,259 A | | 9/1980 | Lagneaux |
| 4,440,795 A | | 4/1984 | Goldstein et al. |
| 4,495,204 A | | 1/1985 | Weaver et al. |
| 4,496,080 A | | 1/1985 | Farber et al. |
| 4,497,348 A | | 2/1985 | Sedam |
| 4,590,085 A | | 5/1986 | Sidoti et al. |

(Continued)

FOREIGN PATENT DOCUMENTS

| | | |
|---|---|---|
| CN | 101195793 A | 6/2008 |
| CN | 101195794 A | 6/2008 |

(Continued)

OTHER PUBLICATIONS

Marcq, P. et.al, "Characterization of the Key Aroma Compounds in a Commercial Amontillado Sherry Wine by Means of the Sensomics Approach", Journal of Agricultural and Food Chemistry, 2015, vol. 63, pp. 4761-4770.

(Continued)

*Primary Examiner* — Helen F Heggestad
(74) *Attorney, Agent, or Firm* — Buchanan Ingersoll & Rooney PC

(57) ABSTRACT

A method of making a sherry wine-like beverage includes combining water, ethanol and a plurality of flavor compounds in an amount sufficient to impart the flavor of a sherry wine without the need for fermentation and/or aging.

36 Claims, 2 Drawing Sheets

(56) References Cited

U.S. PATENT DOCUMENTS

| | | | |
|---|---|---|---|
| 4,626,437 | A | 12/1986 | Schobinger et al. |
| 4,810,505 | A | 3/1989 | Pachernegg |
| 4,885,184 | A | 12/1989 | Patino et al. |
| 5,082,143 | A | 1/1992 | Schramm, Jr. |
| 5,341,957 | A | 8/1994 | Sizemore |
| 5,618,572 | A | 4/1997 | Tripp et al. |
| 5,731,981 | A | 3/1998 | Simard |
| 6,354,190 | B1 | 3/2002 | Haydon |
| 6,506,430 | B1 | 1/2003 | Zimlich, III et al. |
| 6,607,013 | B1 | 8/2003 | Leoni |
| 6,682,766 | B2 | 1/2004 | Blumenstein-Stahl et al. |
| 6,758,130 | B2 | 7/2004 | Sargent et al. |
| 7,008,652 | B2 | 3/2006 | Effler |
| 7,223,426 | B2 | 5/2007 | Cheng et al. |
| 7,559,346 | B2 | 7/2009 | Herrick et al. |
| 7,640,843 | B2 | 1/2010 | Halliday et al. |
| 7,891,286 | B2 | 2/2011 | Scarchilli et al. |
| 7,989,014 | B2 | 8/2011 | Van Der Ark et al. |
| 8,162,176 | B2 | 4/2012 | Rudick |
| D670,539 | S | 11/2012 | Starr et al. |
| 8,561,524 | B2 | 10/2013 | Demiglio et al. |
| 8,586,117 | B2 | 11/2013 | Vastardis et al. |
| 8,590,753 | B2 | 11/2013 | Marina et al. |
| 8,673,384 | B2 | 3/2014 | Kageyama et al. |
| 2002/0102345 | A1 | 8/2002 | Ramirez |
| 2004/0129720 | A1 | 7/2004 | Cheng et al. |
| 2005/0112249 | A1 | 5/2005 | Herrick et al. |
| 2005/0130278 | A1 | 6/2005 | Mitsuhashi et al. |
| 2006/0118581 | A1 | 6/2006 | Clark |
| 2006/0193947 | A1 | 8/2006 | Anderson et al. |
| 2007/0205221 | A1 | 9/2007 | Carpenter et al. |
| 2007/0231428 | A1 | 10/2007 | Mensour et al. |
| 2007/0254063 | A1 | 11/2007 | Aerts et al. |
| 2008/0193599 | A1 | 8/2008 | Binder et al. |
| 2009/0028999 | A1 | 1/2009 | Melisch et al. |
| 2009/0204473 | A1 | 8/2009 | Sommerfeld |
| 2009/0317511 | A1 | 12/2009 | Kawamata et al. |
| 2010/0047386 | A1 | 2/2010 | Tatera |
| 2010/0221404 | A1 | 9/2010 | Little |
| 2010/0308078 | A1 | 12/2010 | Saveliev et al. |
| 2011/0011269 | A1 | 1/2011 | Choi |
| 2011/0017776 | A1 | 1/2011 | Metropulos et al. |
| 2011/0318459 | A1 | 12/2011 | George et al. |
| 2012/0035761 | A1 | 2/2012 | Tilton et al. |
| 2012/0114819 | A1 | 5/2012 | Ragnarsson et al. |
| 2013/0064956 | A1 | 3/2013 | Zeller et al. |
| 2013/0101724 | A1 | 4/2013 | Kawamoto et al. |
| 2013/0233180 | A1 | 9/2013 | Belmont |
| 2013/0239817 | A1 | 9/2013 | Starr et al. |
| 2014/0272006 | A1 | 9/2014 | Schuh et al. |
| 2014/0272019 | A1 | 9/2014 | Schuh et al. |
| 2015/0257428 | A1 | 9/2015 | Schuh et al. |
| 2016/0073673 | A1 | 3/2016 | Schuh et al. |

FOREIGN PATENT DOCUMENTS

| | | |
|---|---|---|
| DE | 2 145 298 A1 | 3/1973 |
| DE | 196 19 370 A1 | 11/1997 |
| DE | 198 13 749 A1 | 10/1999 |
| DE | 20 2004 020 429 U1 | 6/2005 |
| DE | 10 2004 057 546 A1 | 2/2006 |
| EP | 0 002 987 A1 | 7/1979 |
| EP | 0 027 880 A2 | 5/1981 |
| EP | 1 704 803 A1 | 9/2006 |
| GB | 2 145 427 A | 3/1985 |
| GB | 2 261 442 A | 5/1993 |
| GB | 2 454 558 A | 5/2009 |
| NZ | 546370 A | 8/2010 |
| WO | 98/26997 A2 | 6/1998 |
| WO | 99/27070 A1 | 6/1999 |
| WO | 02/02497 A1 | 1/2002 |
| WO | 2008/112737 A1 | 9/2008 |
| WO | 2014/152558 A2 | 9/2014 |

OTHER PUBLICATIONS

Adventures in HomeBrewing; Flavored Extract Cans. Retrieved Jul. 21, 2014. http://www.homebrewing.org/flavored-Extract-Cans_c_220.html. (5 pages).

Adventures in HomeBrewing; Flavored Extract Cans. Retrieved Sep. 3, 2015. http://www.homebrewing.org/flavored-Extract-Cans_c_220.html. (10 pages).

Database FSTA, International Food Information Service, XP-002728437, Hanke et al., "Influence of ethyl acetate, isoamyl acetate and linalool on off-flavour perception in beer," 2011, FS-2011-07-Hc3181. (1 page).

Definition of "Liquor", CollinsDictionary, Retrieved Aug. 14, 2012. <https://web.archive.org/web/20120814144231/http://www.collinsdictionary.com/dictionary/english/liquor>. (2 pages).

Ferreira et al., "Fast and Quantitative Determination of Wine Flavor Compounds Using Microextraction with Freon 113", Journal of Agricultural and Food Chemistry, (Sep. 1993), vol. 41, No. 9, pp. 1413-1420. (8 pages).

Ferreira et al., "Chemical Characterization of the Aroma of Grenache Rosé Wines: Aroma Extract Dilution Analysis, Quantitative Determination, and Sensory Reconstitution Studies", Journal of Agricultural and Food Chemistry, (Jul. 3, 2002), vol. 50, No. 14, pp. 4048-4054. (8 pages).

Fritsch et al., "Identification Based on Quantitative Measurements and Aroma Recombination of the Character Impact Odorants in a Bavarian Pilsner-type Beer", Journal of Agricultural and Food Chemistry, (Sep. 21, 2005), vol. 53, No. 19, pp. 7544-7551. (8 pages).

Glabasnia et al., "Sensory-Directed Identification of Taste-Active Ellagitannins in American (*Quercus alba* L.) and European Oak Wood (*Quercus robur* L.) and Quantitative Analysis in Bourbon Whiskey and Oak-Matured Red Wines", Journal of Agricultural and Food Chemistry, (May 3, 2006), vol. 54, No. 9, pp. 3380-3390. (11 pages).

Haseleu et al., "Structure determination and sensory evaluation of novel bitter compounds formed from β-acids of hop (*Humulus lupulus* L.) upon wort boiling", Food Chemistry, (Sep. 1, 2009), vol. 116, No. 1, pp. 71-81. (11 pages).

International Search Report (Form PCT/ISA/210) and the Written Opinion of the International Searching Authority (Form PCT/ISA/237) issued on Jan. 30, 2015, by the European Patent Office, in corresponding International Application No. PCT/US2014/027473. (16 pages).

International Search Report (Form PCT/ISA/210) and the Written Opinion of the International Searching Authority (Form PCT/ISA/237) issued on Jun. 16, 2015, by the European Patent Office, in corresponding International Application No. PCT/US2015/020455. (9 pages).

"Introducing Insta-Beer". Retrieved Jun. 2, 2014. http://www.kegworks.com/company/insta-beer. (1 page).

Invitation to Pay Additional Fees and Partial International Search for PCT/US2014/027473 dated Oct. 9, 2014. (7 pages).

Irwin et al., "A Rapid Method for the Extraction and Anaylsis of Beer Flavour Components", Journal of the Institute of Brewing, (Mar.-Apr. 1987), vol. 93, No. 2, pp. 113-115. (3 pages).

Java Distribution, Roast & Coffee Characteristics: Character Description. Retrieved Apr. 16, 2011. <https://web.archive.org/web/20110416034251/http://www.javadistribution.com/roastscoffeecharacteristics/>.

"Just Add Water and You Have Instant Beer!" The Dispatch, Lexington, North Carolina, Aug. 13, 1963.

Leee et al., "Measurement of Thresholds for Reference Compounds for Sensory Profiling of Scotch Whisky", Journal of the Institute of Brewing, (2000), vol. 106, No. 5, pp. 287-294. (8 pages).

Lee et al. "Origins of Flavour in Whiskies and a Revised Flavour Wheel: A Review", Journal of the Institute of Brewing, (2001), vol. 107, No. 5, pp. 287-313. (28 pages).

López et al., "Determination of minor and trace volatile compounds in wine by solid-phase extraction and gas chromatography with mass spectrometric detection", Journal of Chromatography A, (Aug. 9, 2002), vol. 966, No. 1-2, pp. 167-177. (12 pages).

(56) References Cited

OTHER PUBLICATIONS

Monster Brew; Beer and Wine Kits. Retrieved Jul. 21, 2014. http://www.monsterbrew.com/Cat-IngredientKits.cfm.

Mother Nature Network, Creative Ways to Backpack with Booze: Powdered Beer. Retrieved Jan. 24, 2012. <https://web.archive.org/web/20120124030526/http://www.mnn.com/food/beverages/photos/creative-ways-to-backpack-with-booze/powdered-beer>. (2 pages).

Mr. Beer Home Brewing; Mr. Beer Kits. Retrieved Jul. 21, 2014. http://www.mr.beer.com/beer-kits. (3 pages).

Mr. Beer Home Brewing; Mr. Beer Kits. Retrieved Sep. 2, 2015. http://www.mr.beer.com/beer-kits. (5 pages).

Poisson et al., "Characterization of the Key Aroma Compounds in an American Bourbon Whisky by Quantitative Measurements, Aroma Recombination, and Omission Studies", Journal of Agricultural and Food Chemistry, (Jul. 23, 2008), vol. 56, No. 14, pp. 5820-5826. (7 pages).

Poisson et al., "Characterization of the Most Odor-Active Compounds in an American Bourbon Whisky by Application of the Aroma Extract Dilution Analysis", Journal of Agricultural and Food Chemistry, (Jul. 23, 2008), vol. 56, No. 14, pp. 5813-5819. (7 pages).

Portersfield, "When Science Develops Instant Beer, Suds Quaffer Becomes Hopping Sad", The Milwaukee Journal (Jul. 17, 1960). (1 page).

The Siebel Institute of Technology; Specialty Sensory Training Kit. Retrieved Sep. 3, 2015. http://www.siebelinstitute.com/products-a-books/sensory-training-lits?page=shop.product_details & flypage=flypage.tpl & product id=35 & category id=6. (13 pages).

Whisky Science, Oaky Flavours, Posted Feb. 15, 2011. <http://whiskyscience.blogspot.com/2011/02/oakyflavours.html> (4 pages).

Williams, "Recent Developments in the Field of Wine Flavour Research", Journal of the Institute of Brewing, (Jan.-Feb. 1982), vol. 88, No. 1, pp. 43-53. (12 pages).

\* cited by examiner

US 9,771,552 B2

FLAVOR SYSTEM AND METHOD FOR MAKING SHERRY WINE LIKE BEVERAGES

CROSS-REFERENCE TO RELATED APPLICATION

This application claims priority under 35 U.S.C. §119(e) to U.S. provisional Application No. 61/951,954, filed on Mar. 12, 2014, the entire content of which is incorporated herein by reference thereto.

BACKGROUND

Sherry wine is a fortified wine that is produced in Andalusia, south of Spain. The three major types of sherry wine, Fino, Amontillado and Oloroso, are made of white grapes but undergo different maturation processes. The light sherry wine Fino is aged under a layer of yeast while Oloroso is aged in direct contact with oxygen making it darker. Amontillado is aged under both microbial and oxidative conditions which give a color in between the two. Another particularity of sherry wine is its dynamic aging system which consists of blending wines of different ages in order to achieve uniformity over years.

Currently, sherry wines produced as described above include over 400 known volatiles, only a small number of which are odorants that are detected by human odorant receptors.

SUMMARY

A method of making a sherry wine-like beverage comprises adding at least one flavor compound selected from a first group of compounds to a quantity of aqueous solution, the first group of compounds consisting of caprylic acid, isobutyric acid, butyric acid, 3-methylbutyric acid, isovaleric acid, caproic acid, and decanoic acid, wherein the at least one flavor compound selected from the first group is added in an amount ranging from about 2 µg/L to about 400,000 µg/L and adding at least one flavor compound selected from a second group of compounds to the quantity of aqueous solution, the second group consisting of 2-methylbutanol, isoamyl alcohol, diacetyl, vanillin, methylpropanol, isovaleraldehyde, 2-methylpropanal, 2-methylbutanal, 4-hydroxy-2,5-dimethylfuran-3(2H)-one, acetovanillone, 2,3-pentanedione, and ethylfuraneol, wherein the at least one flavor compound selected from the second group is added in an amount ranging from about 0.5 µg/L to about 4,000,000 µg/L. The method also includes adding at least one flavor compound selected from a third group of compounds to the quantity of aqueous solution, the third group consisting of 2-phenylethanol, phenylacetic acid, 2-phenylethyl acetate, and linalool, wherein the at least one flavor compound selected from the third group is added in an amount ranging from about 0.1 µg/L to about 1,000,000 µg/L; and adding at least one flavor compound selected from a fourth group of compounds to the quantity of aqueous solution, the fourth group consisting of acetaldehyde, butanoic acid ethyl ester, ethyl isobutyrate, octanoic acid ethyl ester, hexanoic acid ethyl ester, ethyl isovalerate, 2-methylbutanoic acid ethy ester, (E)-β-damascenone, 1,1-diethoxyethane, propanoic acid ethyl ester, (L)-ethyl-2-ethyl lactate, ethyl DL-leucate, 3-methylbutyl acetate, and trans ethyl-cinnamate, wherein the at least one flavor compound selected from the fourth group is added in an amount ranging from about 0.01 µg/L to about 20,000,000 µg/L. The method also includes adding at least one flavor compound selected from a fifth group of compounds to the quantity of aqueous solution, the fifth group consisting of cis-oak lactone, eugenol, 4-ethyl-guaiacol, guaiacol, 4-methyl-guaiacol, 4-propyl-guaiacol, 5-pentyldihydrofuran-2(3H)-one, and 5-hexyldihydrofuran-2(3H)-one, wherein the at least one flavor compound selected from the fifth group is added in an amount ranging from about 0.05 µg/L to about 5,500 µg/L; and adding at least one flavor compound selected from a sixth group of compounds to the quantity of aqueous solution, the sixth group consisting of sotolone, methionol, methional, dimethyl sulfide, dimethyltrisulfide, (E)-2-nonenal, (E,E)-2,4-decadienal, and (E,E)-2,4-nonadienal, wherein the at least one flavor compound selected from the sixth group is added in an amount ranging from about 0.02 µg/L to about 70,000 µg/L. The flavor compounds are included in amounts sufficient to form a beverage having the flavor of sherry wine without the need for fermentation and aging. The method can also include adding at least one flavor compound selected from a seventh group of compounds to the quantity of aqueous solution, the seventh group consisting of 4-ethylphenol, p-cresol, m-cresol, o-cresol, and phenol, wherein the at least one flavor compound selected from the seventh group is added in an amount ranging from about 0.02 µg/L to about 5,000 µg/L.

The method can also include adding at least one compound selected from an eighth group consisting of acetic acid, tartaric acid, succinic acid, lactic acid, and citric acid to the quantity of aqueous solution, the at least one compound selected from the eighth group being added in an amount ranging from about 4,000 µg/L to about 20,000,000 µg/L; adding at least one compound selected from a ninth group consisting of glycerol, glucose, fructose, L-proline, and saccharose to the quantity of aqueous solution, the at least one compound selected from the ninth group being added in an amount of about 1 µg/L to about 600,000,000 µg/L; adding at least one compound selected from a tenth group consisting of salts of potassium, magnesium, and calcium to the quantity of aqueous solution, the at least one compound selected from the tenth group being added in an amount ranging from about 2,500 µg/L to about 10,000,000 µg/L; and adding at least one compound selected from an eleventh group consisting of tannic acid, aconitic acid, and oak extract to the quantity of aqueous solution, the at least one compound selected from the eleventh group being added in an amount ranging from about 500 µg/L to about 5,000,000 µg/L.

The method can further include carbonating the beverage to form a carbonated beverage and/or adding a quantity of ethanol to the beverage to form an alcoholic beverage. The ethanol is added in an amount ranging from about 1000 µg/L to about 400,000,000 µg/L. Alternatively, the sherry wine-like beverage is alcohol-free. When ethanol is included, the sherry wine-like beverage has an alcohol content of about 0.1% alcohol by volume to about 25% alcohol by volume.

The method can also include adjusting the pH of the sherry wine-like beverage to a pH of less than about 7. The sherry wine-like beverage can have a pH ranging from about 3 to about 6.

In embodiments, a method of making a flavor system for making a sherry wine-like beverage comprises: adding at least one flavor compound selected from a first group of compounds to a container, the first group of compounds consisting of caprylic acid, isobutyric acid, butyric acid, 3-methylbutyric acid, isovaleric acid, caproic acid, and decanoic acid, wherein the at least one flavor compound selected from the first group is added in an amount ranging from about 2 µg/L to about 400,000 µg/L; adding at least one flavor compound from a second group of compounds to the container, the second group consisting of 2-methylbutanol, isoamyl alcohol, diacetyl, vanillin, methylpropanol, isovaleraldehyde, 2-methylpropanal, 2-methylbutanal, 4-hydroxy-2,5-dimethylfuran-3(2H)-one, acetovanillone, 2,3-pentanedione, and ethylfuraneol, wherein the at least one flavor compound selected from the second group is added in an amount ranging from about 0.05 µg/L to about 4,000,000 µg/L; and adding at least one flavor compound from a third group of compounds to the container, the third group consisting of 2-phenylethanol, phenylacetic acid, 2-phenylethyl acetate, and linalool, wherein the at least one flavor compound selected from the third group is added in an amount ranging from about 0.1 µg/L to about 1,000,000 µg/L. The method can also include adding at least one flavor compound from a fourth group of compounds to the container, the fourth group consisting of acetaldehyde, butanoic acid ethyl ester, ethyl isobutyrate, octanoic acid ethyl ester, hexanoic acid ethyl ester, ethyl isovalerate, 2-methylbutanoic acid ethy ester, (E)-β-damascenone, 1,1-diethoxyethane, propanoic acid ethyl ester, (L)-ethyl-2-ethyl lactate, ethyl DL-leucate, 3-methylbutyl acetate, and trans ethylcinnamate, wherein the at least one flavor compound selected from the fourth group is added in an amount ranging from about 0.01 µg/L to about 20,000,000 µg/L; adding at least one flavor compound from a fifth group of compounds to the container, the fifth group consisting of cis-oak lactone, eugenol, 4-ethyl-guaiacol, guaiacol, 4-methyl-guaiacol, 4-propyl-guaiacol, 5-pentyldihydrofuran-2(3H)-one, and 5-hexyldihydrofuran-2(3H)-one, wherein the at least one flavor compound selected from the fifth group is added in an amount ranging from about 0.05 µg/L to about 5,500 µg/L; and adding at least one flavor compound from a sixth group of compounds to the container, the sixth group consisting of sotolone, methionol, methional, dimethyl sulfide, dimethyltrisulfide, (E)-2-nonenal, (E,E)-2,4-decadienal, and (E,E)-2,4-nonadienal, wherein the at least one flavor compound selected from the sixth group is added in an amount ranging from about 0.02 µg/L to about 70,000 µg/L. The method can also include adding at least one flavor compound from a seventh group of compounds to the container, the seventh group consisting of 4-ethylphenol, p-cresol, m-cresol, o-cresol, and phenol, wherein the at least one flavor compound selected from the seventh group is added in an amount ranging from about 0.1 µg/L to about 5,000 µg/L. The flavor compounds are included in amounts sufficient to form a beverage having the flavor of sherry wine without the need for fermentation and aging.

The method can further include adding at least one compound selected from an eighth group consisting of acetic acid, tartaric acid, succinic acid, lactic acid, and citric acid to the container, the at least one compound selected from the eighth group being added in an amount ranging from about 4,000 µg/L to about 20,000,000 µg/L, adding at least one compound selected from a ninth group consisting of glycerol, glucose, fructose, L-proline, and saccharose to the container, the at least one compound selected from the ninth group being added in an amount of about 1 µg/L to about 600,000,000 µg/L, and adding at least one compound selected from a tenth group consisting of salts of potassium, magnesium, and calcium to the container, the at least one compound being added in an amount ranging from about 2,500 µg/L to about 10,000,000 µg/L. Moreover, the method can include adding at least one compound selected from an eleventh group consisting of tannic acid, aconitic acid, and oak extract to the container, the at least one compound selected from the eleventh group being added in an amount ranging from about 500 µg/L to about 5,000,000 µg/L.

DETAILED DESCRIPTION

Flavor perception of a consumable product is defined as the combined impression of specific aroma, taste and trigeminal compounds along with entities that evoke mouth feel impressions such as astringency, mouth coating, fullness, etc. Aroma compounds are volatiles that interact with olfactory receptors in the nose evoking a signal to the brain interpreted as smell, while the five basic tastes are elicited by interactions of tastants with specific taste receptors for salt, sweet, bitter, sour and umami tastes, respectively.

In general, out of the many hundreds of chemical entities that are found in natural products, especially those of agricultural origin that may also have been subjected to additional fermentation or prolonged storage, only an order often may be responsible for aroma, taste and mouthfeel. State of the art separation, isolation and chemical analysis techniques have allowed the identification and quantification of key flavor compounds out of the many hundreds that may be detected in a natural product. This sophisticated approach, called "sensomics," has been used extensively for food product categories, such as teas and whiskeys. Sensomics can be used to analyze the aroma and/or flavor compounds in sherry wines.

A flavor and/or aroma that mimics exactly the sensory attributes of a certain product by using the same flavor compounds of the natural product is called "nature craft identical" and the combination of chemical entities that mimic the natural product is called "recombinant." Recombinants may be altered or new compounds added to compensate for flavor compounds that cannot be used due to toxicity (not generally recognized as safe (GRAS)) or availability issues and to create new superior flavors. Omissions or additions of certain compounds in "recombinants" have revealed important interplays between aroma, flavor and mouthfeel impressions. This information was used to create the best possible nature craft identical product as outlined in the methods that follow. This approach is primarily based on chemical identification, receptor molecular biology and psychophysics and differs significantly from traditional trial and error artisan creations.

Figure 1:
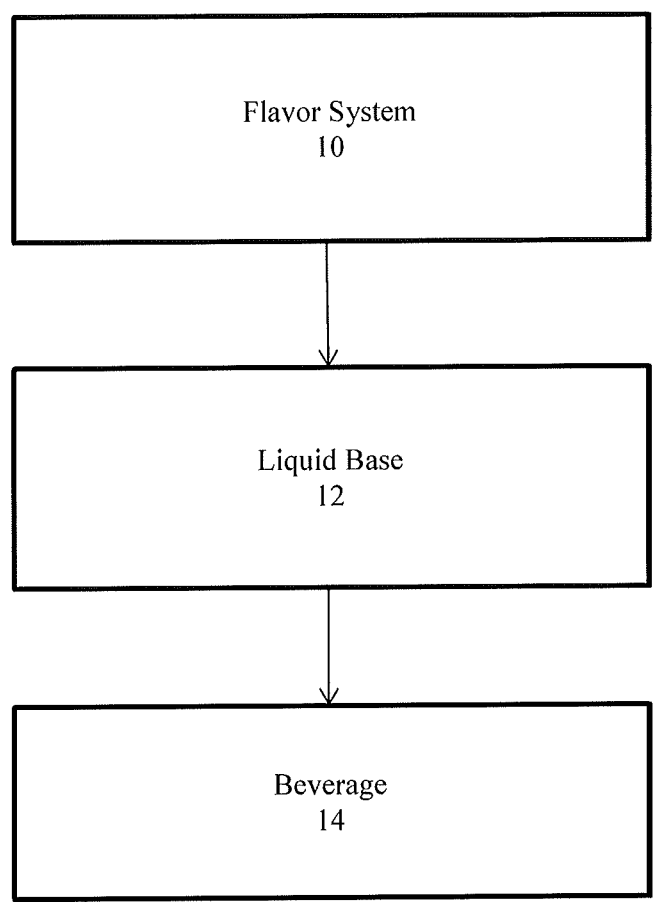
FIG. 1 is a flow chart showing the method of making a beverage using a flavor system as described herein.

As shown in FIG. 1, a flavor system 10 for making a sherry wine-like beverage 14 is provided herein. As used herein, the term "flavor system" describes one or more flavor compounds from one or more of eleven different flavor compound groups having, certain flavor characteristics that are in combination within certain ranges to create sherry wine-like beverages. The flavor compounds include those compounds actually found in sherry wines, which have been chemically analyzed to determine the compounds contained therein using sensomics analysis. The flavor system 10 is combined with a liquid base 12 to form the sherry wine-like beverage 14 as shown without the need for aging and fermentation processes usually associated with the making of sherry wines.

As used herein, the term "flavor" refers to taste, aroma and sensation and is thus a mixture of tastants, aroma compounds and sensates. Thus, for example, the beverages formed herein which have the flavor and/or aroma of sherry wine provide a mixture of tastants, aroma compounds and sensates which mimics that found in a traditionally made sherry wine.

As used herein, the term "sherry wine" describes a fortified wine that is mainly produced in Southern Spain.

The flavor system 10 can be mixed with a liquid base 12, preferably water, to create a sherry-like beverage having the flavor and/or mouthfeel of sherry wine, but without the need for fermentation and/or other costly and time consuming measures associated with the production of sherry wines. The flavor system 10 can be in solid or liquid form. Moreover, the flavor system 10 can include compounds from one or more of the eleven flavor and/or aroma groups described herein along with water, ethanol, colorants, dearomatized wine solutions or powders, and combinations thereof.

Dearomatized wine solutions or powders can be obtained by successive distillations of wine so that the volatile fractions containing the odorants are separated from the non-volatile fractions. The non-volatile fractions can then be dissolved in a solvent such as water and/or ethanol or dried to a powder through processes including lyophilization and added as a powder.

The flavor system and beverages made using the flavor system 10 provide several advantages over conventional fermentation and other sherry wine making operations. First of all, while not wishing to be bound by theory, it is believed that compounds present in conventionally fermented beverages may be responsible for spoilage, thereby limiting the shelf-life of the conventional beverages. In contrast, the flavor system and resulting sherry wine-like beverages as described herein can be tailored to exclude compounds responsible for spoilage. Moreover, other compounds in the conventional beverages could be carcinogenic. Such compounds, which may provide little flavor, can be excluded from the flavor systems and beverages provided herein.

In addition, the use of the flavor system 10 to form sherry wine-like beverages as described herein allows for quick and easy customization of the beverage as compared to conventional beverages and manufacturing systems.

The flavor system 10 can be altered by substituting or adding additional flavor and/or aroma compounds to the flavor system 10, as described herein. The flavor system 10 can include at least one flavor or aroma compound from each of eleven different flavor compound groups described below. Each flavor group includes compounds which impart a particular aroma, taste or mouth feel. Thus, an adult consumer can purchase or make a flavor system, and create a sherry wine-like beverage having only the flavor notes that the consumer prefers and/or only the flavor notes associated with the preferred sherry wine. The consumer can then add additional quantities of the same flavor and/or aroma compounds or add additional flavor and/or aroma compounds to the flavor system to alter the flavor and/or aroma of the beverage, which mimics the taste and/or mouth feel of conventional sherry wines, if desired. The resulting beverages have the flavor and/or aroma of Fino, Amontillado, Oloroso, Manzanilla, Palo Cortado, Pedo Ximenez, Moscatel, Pale cream, Medium or Cream types of sherry wines. The number of compounds included can be varied based on the preferred type of sherry wine and/or on the type of flavor attributes desired. Thus, the aroma, taste, alcohol content, color and/or mouth feel of the sherry wine-like beverage can be altered to suit the consumer.

Various flavor systems 10 having a wide variety of flavors can be rapidly and inexpensively produced and then combined with the liquid base 12 to form the sherry wine-like beverage 14.

In the preferred embodiment, the flavor system 10 includes at least one flavor compound from one or more of each of the following flavor groups: Flavor Group (1): Cheesy, Sweaty Aroma Group; Flavor Group (2): Malty, Buttery and/or Sweet Aroma Group; Flavor Group (3): Floral and/or Honey Aroma Group; Flavor Group (4): Fruity Aroma Group; Flavor Group (5): Smoky, Coconut, Woody Aroma Group; Flavor Group (6): Cooked, Seasoning, Fatty Aroma Group; Flavor Group (7): Phenolic/Medicinal Aroma Group; Flavor Group (8): Sour Taste Group; Flavor Group (9) Sweet Taste Group; Flavor Group (10): Salty and Bitter Taste Group; and/or Flavor Group (11): Astringent, Mouth Feel Group.

In alternative embodiments, the flavor system 10 includes at least one flavor compound from one or more of each of the following groups: (1) Cheesy, Sweaty Aroma Group, (2) Malty, Buttery and/or Sweet Aroma Group, (3) Floral and/or Honey Aroma Group, (4) Fruity Aroma Group, (5) Smoky, Coconut, Woody Aroma Group, (6) Cooked, Seasoning, Fatty Aroma Group, and (7) Phenolic/Medicinal Aroma Group. It is noted that all of the flavor groups including (8) the sour taste group, (9) the sweet taste group, (10) the salt and bitter taste group and (11) the astringent, mouth feel group (Groups 8-11) are not required in every flavor system 10. If desired, the non-volatile flavor compounds contained therein can be replaced with dearomatized wine solutions and powders as described above.

If the flavor system is to be used to form a sherry wine-like beverage which would not include flavor compounds from a particular group as shown in the tables below, none of those compounds would be included in the flavor system 10. The flavor groups can include volatile and non-volatile compounds which can impart certain aromas, tastes and sensations to the flavor system 10 and the resulting sherry wine-like beverage depending on the combination and concentration of the various aroma compounds included therein. The flavor compounds in each group are generally interchangeable with other compounds in the same group. In addition, the flavor compounds in each group can also be interchangeable with other compounds having similar flavor characteristics that are not included in the group because they were either not detected and/or present in the analyzed sherry wine or they were not selected as the most important flavor compounds in the analyzed sherry wine.

Moreover, certain compounds, particularly those in the Astringent, Mouth Feel Group may elicit mouth feel impressions such as tingling, mouth-puckering, smooth, velvety, mouth-coating, etc. In addition, certain compounds may affect the perception of aromas and modulate the perceived aroma intensity.

The compounds included in each flavor group along with a range of the amount of each compound that can be included in the flavor system 10 is shown in Tables 1-11 below. The flavor system 10 can be mixed together and then combined with a quantity of aqueous solution (e.g., water or a mixture of water, ethanol and colorants) or each compound to be included in the flavor system 10 can be separately added to a quantity of aqueous solution.

As shown in Table 1, flavor group 1 includes seven compounds that can impart a cheesy, sweaty aroma to a beverage formed from the flavor system. The compounds of flavor group 1 are selected from the group consisting of caprylic acid, isobutyric acid, butyric acid, 3-methylbutyric acid, isovaleric acid, caproic acid, decanoic acid and combinations thereof. The range of each compound of flavor group 1 that can be included in a sherry wine-like beverage formed from the flavor system 10 in micrograms per liter of aqueous solution (μg/L) is shown. In addition, each of the flavor group 1 compounds can be substituted for other compounds in the same group or for other compounds having similar flavor characteristics not included in group 1 to achieve a similar aroma.

TABLE 1

| Category descriptor | Compound | Range for inclusion in Sherry Wine-like beverage | |
|---|---|---|---|
| | | low μg/L | high μg/L |
| Flavor Group 1 cheesy, sweaty aroma | caprylic acid | 2 | 30,000 |
| | isobutyric acid | 5 | 400,000 |
| | butyric acid | 10 | 150,000 |
| | 3-methylbutyric acid | 5 | 150,000 |
| | isovaleric acid | 2 | 100,000 |
| | caproic acid | 5 | 90,000 |
| | decanoic acid | 250 | 10,000 |

As shown in Table 2, flavor group 2 includes twelve compounds that can impart a malty, buttery and/or sweet, caramel-like aroma to a sherry wine-like beverage formed from the flavor system 10. The compounds of flavor group 2 are selected from the group consisting of 2-methylbutanol, isoamyl alcohol, diacetyl, vanillin, methylpropanol, isovaleraldehyde, 2-methylpropanal, 2-methylbutanal, 4-hydroxy-2,5-dimethylfuran-3(2H)-one (furaneol), acetovanillone, 2,3-pentanedione, ethylfuraneol and combinations thereof. The range of each compound of flavor group 2 that can be included in the flavor system 10 for forming a sherry wine-like beverage in micrograms per liter of aqueous solution (μg/L) is shown. Moreover, each of the flavor group 2 compounds can be substituted for other compounds in the same group or for other compounds having similar flavor characteristics not included in group 2 to achieve a similar aroma.

TABLE 2

| Category descriptor | Compound | Range for inclusion in Sherry Wine-like Beverage | |
|---|---|---|---|
| | | low μg/L | high μg/L |
| Flavor Group 2- malty, buttery, sweet aroma | 2-methylbutanol | 40 | 4,000,000 |
| | isoamyl alcohol | 40 | 4,000,000 |
| | Diacetyl | 5 | 170,000 |
| | Vanillin | 0.4 | 12,000 |
| | methylpropanol | 40 | 3,000,000 |
| | isovaleraldehyde | 3 | 15,000 |
| | 2-methylpropanal | 4 | 14,000 |
| | 2-methylbutanal | 2 | 10,000 |
| | 4-hydroxy-2,5-dimethylfuran-3(2H)-one (furaneol) | 0.05 | 250 |
| | acetovanillone | 1 | 10,000 |
| | 2,3-pentanedione | 1 | 50,000 |
| | ethylfuraneol | 0.5 | 50 |

As shown in Table 3, flavor group 3 includes five compounds that can impart a floral, honey, citrus or metallic-like aroma to a sherry wine-like beverage formed from the flavor system 10. The compounds of flavor group 3 are selected from the group consisting of 2-phenylethanol, phenylacetic acid, 2-phenylethyl acetate, linalool, and combinations thereof. The range of each compound of flavor group 3 that can be included in the flavor system 10 for forming a sherry wine-like beverage in micrograms per liter of aqueous solution (μg/L) is shown. Moreover, each of the flavor group 3 compounds can be substituted for other compounds in the same group or for other compounds having similar flavor characteristics not included in group 3 to achieve a similar aroma.

TABLE 3

| Category descriptor | Compound | Range for inclusion in Sherry Wine-like Beverage | |
|---|---|---|---|
| | | low μg/L | high μg/L |
| Flavor Group 3- Floral, honey | 2-phenylethanol | 30 | 1,000,000 |
| | phenylacetic acid | 0.1 | 5,000 |
| | 2-phenylethyl acetate | 5 | 500 |
| | linalool | 0.5 | 500 |

As shown in Table 4, flavor group 4 includes fourteen compounds that can impart a fruity, green-like aroma to a sherry wine-like beverage formed from the flavor system 10. The compounds of flavor group 4 are selected from the group consisting of acetaldehyde, butanoic acid ethyl ester, ethyl isobutyrate, octanoic acid ethyl ester, hexanoic acid ethyl ester, ethyl isovalerate, 2-methylbutanoic acid ethy ester, (E)-β-damascenone, 1,1-diethoxyethane, propanoic acid ethyl ester, (L)-ethyl-2-ethyl lactate, ethyl DL-leucate, 3-methylbutyl acetate, trans ethyl-cinnamate and combinations thereof. The range of each compound of flavor group 4 that can be included in the flavor system 10 for forming a sherry wine-like beverage in micrograms per liter of aqueous solution (μg/L) is shown. Moreover, each of the flavor group 4 compounds can be substituted for other compounds in the same group or for other compounds having similar flavor characteristics not included in group 4 to achieve a similar aroma.

TABLE 4

| Category descriptor | Compound | Range for inclusion in Sherry Wine-like Beverage | |
|---|---|---|---|
| | | low μg/L | high μg/L |
| Flavor Group 4- fruity aroma | Acetaldehyde | 450 | 8,000,000 |
| | Butanoic acid ethyl ester | 3 | 30,000 |
| | Ethyl isobutyrate | 2 | 60,000 |
| | Octanoic acid ethyl ester | 0.5 | 5,500 |
| | Hexanoic acid ethyl ester | 1 | 20,000 |
| | Ethyl isovalerate | 0.5 | 13,000 |
| | 2-methylbutanoic acid ethy ester | 0.3 | 10,000 |
| | (E)-β-damascenone | 0.01 | 200 |
| | 1,1-diethoxyethane | 500 | 20,000,000 |
| | Propanoic acid ethyl ester | 100 | 300,000 |
| | (L)-ethyl-2-ethyl lactate | 0.2 | 20,000 |
| | Ethyl DL-leucate | 1 | 45,000 |
| | 3-methylbutyl acetate | 300 | 10,000 |
| | trans-ethyl cinnamate | 0.2 | 100 |

As shown in Table 5, flavor group 5 includes eight compounds that can impart a smoky, coconut, and/or woody-like aroma to a sherry wine-like beverage formed from the flavor system 10. The compounds of flavor group 5 are selected from the group consisting of cis-oak lactone, eugenol, 4-ethyl-guaiacol, guaiacol, 4-methyl-guaiacol, 4-propyl-guaiacol, 5-pentyldihydrofuran-2(3H)-one, 5-hexyldihydrofuran-2(3H)-one, and combinations thereof. The range of each compound of flavor group 5 that can be included in the flavor system 10 for forming a sherry wine-like beverage in micrograms per liter of aqueous solution (μg/L) is shown. Moreover, each of the flavor group 5 compounds can be substituted for other compounds in the same group or for other compounds having similar flavor characteristics not included in group 5 to achieve a similar aroma.

TABLE 5

| Category descriptor | Compound | Range for inclusion in Sherry Wine-like Beverage | |
|---|---|---|---|
| | | low μg/L | high μg/L |
| Flavor Group 5- Smoky, coconut, woody aroma | cis-oak lactone | 0.2 | 2,500 |
| | eugenol | 0.05 | 250 |
| | 4-ethyl-guaiacol | 0.1 | 5,500 |
| | guaiacol | 0.1 | 200 |
| | 4-methyl-guaiacol | 0.5 | 50 |
| | 4-propyl-guaiacol | 0.5 | 50 |
| | 5-pentyldihydrofuran-2(3H)-one | 2 | 100 |
| | 5-hexyldihydrofuran-2(3H)-one | 0.3 | 10 |

As shown in Table 6, flavor group 6 includes eight compounds that can impart a cooked, seasoning and/or fatty-like aroma to a sherry wine-like beverage formed from the flavor system 10. The compounds of flavor group 6 are selected from the group consisting of sotolone, methionol, methional, dimethyl sulfide, dimethyltrisulfide, (E)-2-nonenal, (E,E)-2,4-decadienal, (E,E)-2,4-nonadienal and combinations thereof. The range of each compound of flavor group 6 that can be included in the flavor system 10 for forming a sherry wine-like beverage in micrograms per liter of aqueous solution (μg/L) is shown. Moreover, each of the flavor group 6 compounds can be substituted for other compounds in the same group or for other compounds having similar flavor characteristics not included in group 6 to achieve a similar aroma.

TABLE 6

| Category descriptor | Compound | Range for inclusion in Sherry Wine-like Beverage | |
|---|---|---|---|
| | | low μg/L | high μg/L |
| Flavor Group 6- cooked, seasoning, fatty aroma | sotolone | 0.5 | 4,000 |
| | methionol | 2 | 70,000 |
| | methional | 0.3 | 4,000 |
| | dimethyl sulfide | 1 | 50 |
| | Dimethyltrisulfide | 0.02 | 2 |
| | (E)-2-nonenal | 1 | 100 |
| | (E,E)-2,4-decadienal | 1 | 100 |
| | (E,E)-2,4-nonadienal | 0.1 | 10 |

As shown in Table 7, flavor group 7 includes five compounds that can impart a phenolic and/or medicinal aroma to a sherry wine-like beverage formed from the flavor system 10. The compounds of flavor group 7 are selected from the group consisting of 4-ethylphenol, p-cresol, m-cresol, o-cresol, phenol, and combinations thereof. The range of each compound of flavor group 7 that can be included in the flavor system 10 for forming a sherry wine-like beverage in micrograms per liter of aqueous solution (μg/L) is shown. Each of the flavor group 7 compounds can be substituted for other compounds in the same group or for other compounds having similar flavor characteristics not included in group 7 to achieve a similar aroma.

TABLE 7

| Category descriptor | Compound | Range for inclusion in Sherry Wine-like Beverage | |
|---|---|---|---|
| | | low μg/L | high μg/L |
| Flavor Group 7- phenolic, medicinal aroma | 4-ethylphenol | 0.4 | 5,000 |
| | p-cresol | 0.1 | 500 |
| | m-cresol | 0.1 | 500 |
| | o-cresol | 0.1 | 500 |
| | phenol | 0.1 | 1,000 |

As shown in Table 8, flavor group 8 includes five compounds that can impart a sour taste to a sherry-wine like beverage formed from the flavor system 10. The compounds of flavor group 8 are selected from the group consisting of acetic acid, tartaric acid, succinic acid, lactic acid, citric acid, and combinations thereof. The range of each compound of flavor group 8 that can be included in the flavor system 10 for forming a sherry wine-like beverage in micrograms per liter of aqueous solution (μg/L) is shown. Each of the flavor group 8 compounds can be substituted for other compounds in the same group or for other compounds having similar flavor characteristics not included in group 8 to form a flavor system 10 which produces a beverage having a similar taste.

TABLE 8

| Category descriptor | Compound | Range for inclusion in Sherry Wine-like Beverage | |
|---|---|---|---|
| | | low μg/L | high μg/L |
| Flavor Group 8- sour taste | tartaric acid | 5,000 | 20,000,000 |
| | succinic acid | 250,000 | 5,000,000 |
| | lactic acid | 300,000 | 7,500,000 |
| | citric acid | 300,000 | 7,500,000 |
| | acetic acid | 4,000 | 20,000,000 |

As shown in Table 9, flavor group 9 includes five compounds that can impart a sweet taste to a sherry wine-like beverage. The compounds of flavor group 9 are selected from the group consisting of glycerol, glucose, fructose, L-proline, saccharose, and combinations thereof. The range of each compound of flavor group 9 that can be included in the flavor system 10 for forming a sherry wine-like beverage in micrograms per liter of aqueous solution (μg/L) is shown. Each of the flavor group 9 compounds can be substituted for other compounds in the same group or for other compounds having similar flavor characteristics not included in group 9 to form a flavor system 10 which produces a sherry wine-like beverage having a similar taste. However, as shown in Table 9, the flavor system 10 need not include fructose unless desired, but the flavor system 10 preferably includes at least one other compound from the ninth group as shown below.

TABLE 9

| Category descriptor | Compound | Range for inclusion in Sherry Wine-like Beverage low µg/L | high µg/L |
| --- | --- | --- | --- |
| Flavor Group 9- sweet taste | glycerol | 100,000 | 500,000,000 |
| | glucose | 250 | 600,000,000 |
| | fructose | 1 | 600,000,000 |
| | L-proline | 100,000 | 10,000,000 |
| | saccharose | 500,000 | 500,000,000 |

As shown in Table 10, flavor group 10 includes three compounds that can impart a salty and/or bitter taste to a flavor system for forming a sherry wine-like beverage. The compounds of flavor group 10 are selected from the group consisting of salts of potassium, magnesium, calcium, and combinations thereof, such as, for example, potassium chloride, magnesium chloride, calcium chloride, potassium carbonate, and other soluble salts. The range of each compound of flavor group 10 that can be included in the flavor system 10 for forming a sherry wine-like beverage in micrograms per liter of aqueous solution (µg/L) is shown. Each of the flavor group 10 compounds can be substituted for other compounds in the same group or for other compounds having similar flavor characteristics not included in group 10 to form a flavor system 10 which produces a beverage having a similar taste.

TABLE 10

| Category descriptor | Compound | Range for inclusion in Sherry Wine-like Beverage low µg/L | high µg/L |
| --- | --- | --- | --- |
| Flavor Group 10- Salty, Bitter taste | Potassium ion ($K^+$) | 2,500 | 10,000,000 |
| | Magnesium ion ($Mg^{2+}$) | 2,500 | 2,000,000 |
| | Calcium ion ($Ca^{2+}$) | 2,500 | 500,000 |

As shown in Table 11, flavor group 11 includes three compounds that can impart an astringent mouth feel to a flavor system 10 for forming a sherry wine-like beverage. The compounds of flavor group 11 are selected from the group consisting of tannic acid, aconitic acid, oak extract, and combinations thereof. The range of each compound of flavor group 11 that can be included in the flavor system 10 for forming a sherry wine-like beverage in micrograms per liter of aqueous solution (µg/L) is shown. Moreover, each of the flavor group 11 compounds can be substituted for other compounds in the same group or for other compounds having similar flavor characteristics not included in group 11 to form a flavor system 10 which produces a beverage having a similar taste.

TABLE 11

| Category descriptor | Compound | Range in Any Beverage low µg/L | high µg/L |
| --- | --- | --- | --- |
| Flavor Group 11- Astringent mouth feel | tannic acid | 30,000 | 150,000 |
| | aconitic acid | 500 | 25,000 |
| | Oak extract | 1,000,000 | 5,000,000 |

In addition, the flavor system 10 can also include ethanol so as to produce an alcoholic beverage therefrom or ethanol can be added to the liquid base in addition to the flavor system 10. Alternatively, the beverage can be alcohol-free, if desired.

When an alcoholic beverage is desired, ethanol can be included in an amount up to about 474,000,000 µg/L of water (e.g., about 1000 µg/L to about 400,000,000 µg/L, about 10,000 to about 300,000,000 µg/L, about 100,000 µg/L to about 20,000,0000 µg/L, about 200,000 µg/L to about 10,000,000 µg/L or about 300,000 µg/L to about 900,000 µg/L).

Moreover, ethanol can be added in an amount sufficient to produce a sherry wine-like beverage having an alcohol content ranging from about 0.1% alcohol by volume to about 80% alcohol by volume. For example, a sherry wine-like beverage produced as described herein can include ethanol in an amount sufficient to produce a wine-like beverage having an alcohol content of about 0.1% alcohol by volume to about 25% alcohol by volume.

By including one or more (e.g., two or more, three or more, four or more, five or more, six or more, etc.) compounds from one or more of the aroma and/or flavor groups as described above, the flavor system 10 can be tailored to provide a flavor system 10 which mimics the flavor and/or aroma of a sherry wine. The choice of flavor compounds and the amount included in the flavor system 10 allows a user and/or manufacturer to adjust the flavor of the flavor system 10 and resulting sherry wine-like beverage 14. Moreover, a more diluted and/or less intense beverage can be formed by adding the flavor system 10 to a larger quantity of aqueous solution, while a more intense flavored beverage can be formed by adding the same flavor system 10 to a smaller quantity of aqueous solution.

Preferably, a beverage having a wine taste and/or mouth feel includes at least one (e.g., at least two or at least three) compound from each of the eleven flavor groups. In some embodiments, a beverage having a sherry wine-like taste includes at least one compound from one or more (e.g., at least two, at least three, at least four, at least five, at least six, at least seven, at least eight, at least nine or at least ten) of the eleven flavor groups.

The examples provided below are exemplary and are not meant to limit any aspects of the embodiments disclosed herein.

Example 1

For example, an Amontillado sherry wine-like beverage can be formed by combining the compounds in Table 12 below with water.

TABLE 12

| Category | Compound | Concentration in Amontillado recombinant [µg/L] |
| --- | --- | --- |
| From Group 1 | Caprylic acid | 589 |
| | Isobutyric acid | 2,542 |
| | butyric acid | 1,402 |
| | 3-methylbutyric acid | 497 |
| | Isovaleric acid | 302 |
| | Caproic acid | 1,699 |
| From Group 2 | 2-methylbutanol | 60,032 |
| | Isoamyl alcohol | 90,042 |
| | diacetyl | 1,602 |
| | vanillin | 260 |
| | methylpropanol | 54,950 |

TABLE 12-continued

| Category | Compound | Concentration in Amontillado recombinant [µg/L] |
|---|---|---|
| | isovaleraldehyde | 185 |
| | 2-methylpropanal | 176 |
| | 2-methylbutanal | 130 |
| | 4-hydroxy-2,5-dimethylfuran-3(2H)- | 3.8 |
| | Acetovanillone | 300 |
| From Group 3 | 2-phenylethanol | 11,987 |
| | phenylacetic acid | 95 |
| From Group 4 | acetaldehyde | 57,032 |
| | Butanoic acid ethyl ester | 376 |
| | Ethyl isobutyrate | 454 |
| | Octanoic acid ethyl ester | 105 |
| | Hexanoic acid ethyl ester | 387 |
| | Ethyl isovalerate | 130 |
| | 2-methylbutanoic acid ethy ester | 86 |
| | (E)-β-damascenone | 2 |
| | 1,1-diethoxyethane | 124,000 |
| | Propanoic acid ethyl ester | 6,343 |
| | (L)-ethyl-2-ethyl lactate | 59 |
| | Ethyl DL-leucate | 360 |
| From Group 5 | cis-oak lactone | 23 |
| | eugenol | 2.5 |
| | 4-ethyl-guaiacol | 21 |
| From Group 6 | sotolone | 39 |
| | methionol | 895 |
| | methional | 41 |
| From Group 7 | 4-ethylphenol | 69 |
| From Group 8 | acetic acid | 382.000 |
| | tartaric acid | 4,973,000 |
| From Group 9 | glycerol | 5,240,000 |
| | glucose | 54,300 |
| | Ethanol | 13,397,000 |
| | water | 75,597,043 |

To compare the beverage of Example 1 with a corresponding Amontillado type sherry wine, the wine was first analyzed using sensomics analysis. The sherry-wine like beverage was formulated as described above and compared to the analyzed wine.

Twelve panelists compared the flavor and/or aroma of the analyzed wine with the beverage formed as set forth in Example 1. The panelists were asked to rate the intensity of several aroma descriptors on a scale from 0 to 7. Each panelist was then able to provide an aroma matching score between the analyzed wine and Example 1 on a scale of 0 to 7, with 0 being different and 7 being very similar.

Figure 2:
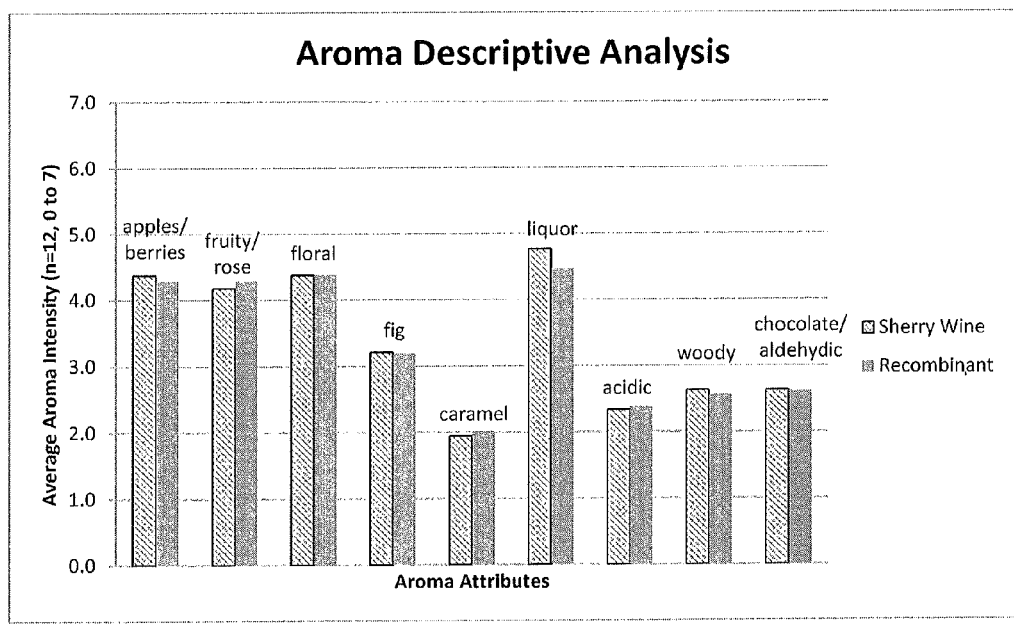
FIG. 2 is a graph comparing the flavor profile of a known Amontillado wine with a beverage formulated according to the methods described herein.

As shown in FIG. 2, the wine formed in Example 1 was rated as being very similar to the analyzed wine, with an overall aroma matching score of 6.

As described in co-pending application Ser. No. 14/208,994 to Schuh et al., filed Mar. 13, 2014, the entire content of which is hereby incorporated by reference, a kit for making a flavored beverage includes a flavor system 10 including a quantity of each of a plurality of flavor and/or aroma compounds, a quantity of sugar and a container. Preferably, the kit includes at least one flavor compound from each of the flavor groups described above. The container is sized to contain the flavor system, sugar, and a predetermined quantity of aqueous solution (not shown). The kit is operable to form a beverage having the flavors and/or aromas of a sherry wine.

The kit can include instructions for combining the various flavor and/or aroma compounds in different combinations and quantities to form a variety of different sherry wine-like beverages.

In this specification, the word "about" is often used in connection with numerical values to indicate that mathematical precision of such values is not intended. Accordingly, it is intended that where "about" is used with a numerical value, a tolerance of ±10% is contemplated for that numerical value.

While the foregoing describes in detail a flavor system and method for forming a beverage with reference to a specific embodiment thereof, it will be apparent to one skilled in the art that various changes and modifications and equivalents to the flavor system and method may be employed, which do not materially depart from the spirit and scope of the invention.

I claim:

1. A method of making a sherry wine-like beverage comprising:
   adding at least one flavor compound selected from a first group of compounds to a quantity of aqueous solution, the first group of compounds consisting of caprylic acid, isobutyric acid, butyric acid, 3-methylbutyric acid, isovaleric acid, caproic acid, and decanoic acid, wherein the at least one flavor compound selected from the first group is added in an amount ranging from about 2 µg/L to about 400,000 µg/L;
   adding at least one flavor compound from a second group of compounds to the quantity of aqueous solution, the second group consisting of 2-methylbutanol, isoamyl alcohol, diacetyl, vanillin, methylpropanol, isovaleraldehyde, 2-methylpropanal, 2-methylbutanal, 4-hydroxy-2,5-dimethylfuran-3(2H)-one, acetovanillone, 2,3-pentanedione, and ethylfuraneol, wherein the at least one flavor compound selected from the second group is added in an amount ranging from about 0.05 µg/L to about 4,000,000 µg/L;
   adding at least one flavor compound from a third group of compounds to the quantity of aqueous solution, the third group consisting of 2-phenylethanol, phenylacetic acid, 2-phenylethyl acetate, and linalool, wherein the at least one flavor compound selected from the third group is added in an amount ranging from about 0.1 µg/L to about 1,000,000 µg/L;
   adding at least one flavor compound from a fourth group of compounds to the quantity of aqueous solution, the fourth group consisting of acetaldehyde, butanoic acid ethyl ester, ethyl isobutyrate, octanoic acid ethyl ester, hexanoic acid ethyl ester, ethyl isovalerate, 2-methylbutanoic acid ethy ester, (E)-β-damascenone, 1,1-diethoxyethane, propanoic acid ethyl ester, (L)-ethyl-2-ethyl lactate, ethyl DL-leucate, 3-methylbutyl acetate, and trans ethyl-cinnamate, wherein the at least one flavor compound selected from the fourth group is added in an amount ranging from about 0.01 µg/L to about 20,000,000 µg/L;
   adding at least one flavor compound from a fifth group of compounds to the quantity of aqueous solution, the fifth group consisting of cis-oak lactone, eugenol, 4-ethyl-guaiacol, guaiacol, 4-methyl-guaiacol, 4-propyl-guaiacol, 5-pentyldihydrofuran-2(3H)-one, and 5-hexyldihydrofuran-2(3H)-one, wherein the at least one flavor compound selected from the fifth group is added in an amount ranging from about 0.05 µg/L to about 5,500 µg/L; adding at least one flavor compound from a sixth group of compounds to the quantity of aqueous solution, the sixth group consisting of sotolone, methionol, methional, dimethyl sulfide, dimethyltrisulfide, (E)-2-nonenal, (E,E)-2,4-decadienal, and (E,E)-2,4-nonadienal, wherein the at least one flavor compound selected from the sixth group is added in an amount ranging from about 0.02 µg/L to about 70,000 µg/L; and adding at least one flavor compound from a seventh group of compounds to the quantity of aqueous solution, the seventh group consisting of 4-ethylphenol, p-cresol, m-cresol, o-cresol, and phenol, wherein the at least one flavor compound selected from the seventh group is added in an amount ranging from about 0.1 μg/L to about 5,000 μg/L, wherein the flavor compounds are included in amounts sufficient to form a beverage having the flavor of sherry wine without the need for fermentation and aging.

2. The method of claim 1, further including adding at least one compound selected from an eighth group consisting of acetic acid, tartaric acid, succinic acid, lactic acid, and citric acid to the quantity of aqueous solution, the at least one compound selected from the eighth group being added in an amount ranging from about 4,000 μg/L to about 20,000,000 μg/L.

3. The method of claim 2, further including adding at least one compound selected from a ninth group consisting of glycerol, glucose, fructose, L-proline, and saccharose to the quantity of aqueous solution, the at least one compound selected from the ninth group being added in an amount of about 1 μg/L to about 600,000,000 μg/L.

4. The method of claim 3, further including adding at least one compound selected from a tenth group consisting of salts of potassium, magnesium, and calcium to the quantity of aqueous solution, the at least one compound being added in an amount ranging from about 2,500 μg/L to about 10,000,000 μg/L.

5. The method of claim 4, further including adding at least one compound selected from an eleventh group consisting of tannic acid, aconitic acid, and oak extract to the quantity of aqueous solution, the at least one compound selected from the eleventh group being added in an amount ranging from about 500 μg/L to about 5,000,000 μg/L.

6. The method of claim 1, further including adding a quantity of ethanol to the quantity of aqueous solution to form an alcoholic beverage.

7. The method of claim 6, wherein the ethanol is added in an amount ranging from about 1000 μg/L to about 400,000,000 μg/L.

8. The method of claim 1, wherein the sherry wine-like beverage is alcohol-free.

9. The method of claim 1, wherein the sherry wine-like beverage has an alcohol content of about 0.1% alcohol by volume to about 25% alcohol by volume.

10. The method of claim 1, further including adjusting the pH of the sherry wine-like beverage to a pH of less than about 7.

11. The method of claim 10, wherein the sherry wine-like beverage has a pH ranging from about 3 to about 6.

12. The method of claim 1, further including adding a quantity of dearomatized wine solutions and/or powders to the beverage.

13. The method of claim 1, wherein a water content of the quantity of aqueous solution ranges from about 0.75 liter to about 1 liter.

14. A beverage produced according to the method of claim 1.

15. A method of making a flavor system for making a sherry wine-like beverage comprising:

adding at least one flavor compound selected from a first group of compounds to container, the first group of compounds consisting of caprylic acid, isobutyric acid, butyric acid, 3-methylbutyric acid, isovaleric acid, caproic acid, and decanoic acid, wherein the at least one flavor compound selected from the first group is added in an amount ranging from about 2 μg/L to about 400,000 μg/L;

adding at least one flavor compound from a second group of compounds to the container, the second group consisting of 2-methylbutanol, isoamyl alcohol, diacetyl, vanillin, methylpropanol, isovaleraldehyde, 2-methylpropanal, 2-methylbutanal, 4-hydroxy-2,5-dimethylfuran-3(2H)-one, acetovanillone, 2,3-pentanedione, and ethylfuraneol, wherein the at least one flavor compound selected from the second group is added in an amount ranging from about 0.05 μg/L to about 4,000,000 μg/L;

adding at least one flavor compound from a third group of compounds to the container, the third group consisting of 2-phenylethanol, phenylacetic acid, 2-phenylethyl acetate, and linalool, wherein the at least one flavor compound selected from the third group is added in an amount ranging from about 0.1 μg/L to about 1,000,000 μg/L;

adding at least one flavor compound from a fourth group of compounds to the container, the fourth group consisting of acetaldehyde, butanoic acid ethyl ester, ethyl isobutyrate, octanoic acid ethyl ester, hexanoic acid ethyl ester, ethyl isovalerate, 2-methylbutanoic acid ethy ester, (E)-β-damascenone, 1,1-diethoxyethane, propanoic acid ethyl ester, (L)-ethyl-2-ethyl lactate, ethyl DL-leucate, 3-methylbutyl acetate, and trans ethyl-cinnamate, wherein the at least one flavor compound selected from the fourth group is added in an amount ranging from about 0.01 μg/L to about 20,000,000 μg/L;

adding at least one flavor compound from a fifth group of compounds to the container, the fifth group consisting of cis-oak lactone, eugenol, 4-ethyl-guaiacol, guaiacol, 4-methyl-guaiacol, 4-propyl-guaiacol, 5-pentyldihydrofuran-2(3H)-one, and 5-hexyldihydrofuran-2(3H)-one, wherein the at least one flavor compound selected from the fifth group is added in an amount ranging from about 0.05 μg/L to about 5,500 μg/L;

adding at least one flavor compound from a sixth group of compounds to the container, the sixth group consisting of sotolone, methionol, methional, dimethyl sulfide, dimethyltrisulfide, (E)-2-nonenal, (E,E)-2,4-decadienal, and (E,E)-2,4-nonadienal, wherein the at least one flavor compound selected from the sixth group is added in an amount ranging from about 0.02 μg/L to about 70,000 μg/L; and adding at least one flavor compound from a seventh group of compounds to the container, the seventh group consisting of 4-ethylphenol, p-cresol, m-cresol, o-cresol, and phenol, wherein the at least one flavor compound selected from the seventh group is added in an amount ranging from about 0.1 μg/L to about 5,000 μg/L, wherein the flavor compounds are included in amounts sufficient to form a beverage having the flavor of sherry wine without the need for fermentation and aging.

16. The method of claim 15, further including adding at least one compound selected from an eighth group consisting of acetic acid, tartaric acid, succinic acid, lactic acid, and citric acid to the container, the at least one compound selected from the eighth group being added in an amount ranging from about 4,000 μg/L to about 20,000,000 μg/L.

17. The method of claim 16, further including adding at least one compound selected from a ninth group consisting of glycerol, glucose, fructose, L-proline, and saccharose to the container, the at least one compound selected from the ninth group being added in an amount of about 1 µg/L to about 600,000,000 µg/L.

18. The method of claim 17, further including adding at least one compound selected from a tenth group consisting of salts of potassium, magnesium, and calcium to the container, the at least one compound being added in an amount ranging from about 2,500 µg/L to about 10,000,000 µg/L.

19. The method of claim 18, further including adding at least one compound selected from an eleventh group consisting of tannic acid, aconitic acid, and oak extract to the container, the at least one compound selected from the eleventh group being added in an amount ranging from about 500 µg/L to about 5,000,000 µg/L.

20. A non-fermented sherry wine-like beverage comprising:
   a quantity of aqueous solution;
   at least one flavor compound selected from a first group of compounds, the first group of compounds consisting of caprylic acid, isobutyric acid, butyric acid, 3-methylbutyric acid, isovaleric acid, caproic acid, and decanoic acid, wherein the at least one flavor compound selected from the first group is added in an amount ranging from about 2 µg/L to about 400,000 µg/L;
   at least one flavor compound from a second group of compounds, the second group consisting of 2-methylbutanol, isoamyl alcohol, diacetyl, vanillin, methylpropanol, isovaleraldehyde, 2-methylpropanal, 2-methylbutanal, 4-hydroxy-2,5-dimethylfuran-3(2H)-one, acetovanillone, 2,3-pentanedione, and ethylfuraneol, wherein the at least one flavor compound selected from the second group is added in an amount ranging from about 0.05 µg/L to about 4,000,000 µg/L;
   at least one flavor compound from a third group of compounds, the third group consisting of 2-phenylethanol, phenylacetic acid, 2-phenylethyl acetate, and linalool, wherein the at least one flavor compound selected from the third group is added in an amount ranging from about 0.1 µg/L to about 1,000,000 µg/L;
   at least one flavor compound from a fourth group of compounds, the fourth group consisting of acetaldehyde, butanoic acid ethyl ester, ethyl isobutyrate, octanoic acid ethyl ester, hexanoic acid ethyl ester, ethyl isovalerate, 2-methylbutanoic acid ethy ester, (E)-β-damascenone, 1,1-diethoxyethane, propanoic acid ethyl ester, (L)-ethyl-2-ethyl lactate, ethyl DL-leucate, 3-methylbutyl acetate, and trans ethyl-cinnamate, wherein the at least one flavor compound selected from the fourth group is added in an amount ranging from about 0.01 µg/L to about 20,000,000 µg/L;
   at least one flavor compound from a fifth group of compounds, the fifth group consisting of cis-oak lactone, eugenol, 4-ethyl-guaiacol, guaiacol, 4-methyl-guaiacol, 4-propyl-guaiacol, 5-pentyldihydrofuran-2(3H)-one, and 5-hexyldihydrofuran-2(3H)-one, wherein the at least one flavor compound selected from the fifth group is added in an amount ranging from about 0.05 µg/L to about 5,500 µg/L;
at least one flavor compound from a sixth group of compounds, the sixth group consisting of sotolone, methionol, methional, dimethyl sulfide, dimethyltrisulfide, (E)-2-nonenal, (E,E)-2,4-decadienal, and (E,E)-2,4-nonadienal, wherein the at least one flavor compound selected from the sixth group is added in an amount ranging from about 0.02 µg/L to about 70,000 µg/L; and
   at least one flavor compound from a seventh group of compounds, the seventh group consisting of 4-ethylphenol, p-cresol, m-cresol, o-cresol, and phenol, wherein the at least one flavor compound selected from the seventh group is added in an amount ranging from about 0.1 µg/L to about 5,000 µg/L,
   wherein the flavor compounds are included in amounts sufficient to form a beverage having the flavor of sherry wine.

21. The beverage of claim 20, further including at least one compound selected from an eighth group consisting of acetic acid, tartaric acid, succinic acid, lactic acid, and citric acid, the at least one compound selected from the eighth group being added in an amount ranging from about 4,000 µg/L to about 20,000,000 µg/L.

22. The beverage of claim 21, further including at least one compound selected from a ninth group consisting of glycerol, glucose, fructose, L-proline, and saccharose, the at least one compound selected from the ninth group being added in an amount of about 1 µg/L to about 600,000,000 µg/L.

23. The beverage of claim 22, further including at least one compound selected from a tenth group consisting of salts of potassium, magnesium, and calcium, the at least one compound being added in an amount ranging from about 2,500 µg/L to about 10,000,000 µg/L.

24. The beverage of claim 23, further including at least one compound selected from an eleventh group consisting of tannic acid, aconitic acid, and oak extract, the at least one compound selected from the eleventh group being added in an amount ranging from about 500 µg/L to about 5,000,000 µg/L.

25. The beverage of claim 20, further including a quantity of ethanol.

26. The beverage of claim 25, wherein the ethanol is present in an amount ranging from about 1000 µg/L to about 400,000,000 µg/L.

27. The beverage of claim 20, wherein the sherry wine-like beverage is alcohol-free.

28. The beverage of claim 20, wherein the sherry wine-like beverage has an alcohol content of about 0.1% alcohol by volume to about 25% alcohol by volume.

29. The beverage of claim 20, further including a quantity of dearomatized wine solutions and/or powders.

30. The beverage of claim 20, wherein a water content of the quantity of aqueous solution ranges from about 0.75 liter to about 1 liter.

31. A flavor system for making a non-fermented sherry wine-like beverage, the flavor system comprising:
   at least one flavor compound selected from a first group of compounds, the first group of compounds consisting of caprylic acid, isobutyric acid, butyric acid, 3-methylbutyric acid, isovaleric acid, caproic acid, and decanoic acid, wherein the at least one flavor compound selected from the first group is added in an amount ranging from about 2 µg/L to about 400,000 µg/L;
   at least one flavor compound from a second group of compounds, the second group consisting of 2-methylbutanol, isoamyl alcohol, diacetyl, vanillin, methylpropanol, isovaleraldehyde, 2-methylpropanal, 2-methylbutanal, 4-hydroxy-2,5-dimethylfuran-3(2H)-one, acetovanillone, 2,3-pentanedione, and ethylfuraneol, wherein the at least one flavor compound selected from the second group is added in an amount ranging from about 0.05 µg/L to about 4,000,000 µg/L;

at least one flavor compound from a third group of compounds, the third group consisting of 2-phenylethanol, phenylacetic acid, 2-phenylethyl acetate, and linalool, wherein the at least one flavor compound selected from the third group is added in an amount ranging from about 0.1 µg/L to about 1,000,000 µg/L;

at least one flavor compound from a fourth group of compounds, the fourth group consisting of acetaldehyde, butanoic acid ethyl ester, ethyl isobutyrate, octanoic acid ethyl ester, hexanoic acid ethyl ester, ethyl isovalerate, 2-methylbutanoic acid ethy ester, (E)-β-damascenone, 1,1-diethoxyethane, propanoic acid ethyl ester, (L)-ethyl-2-ethyl lactate, ethyl DL-leucate, 3-methylbutyl acetate, and trans ethyl-cinnamate, wherein the at least one flavor compound selected from the fourth group is added in an amount ranging from about 0.01 µg/L to about 20,000,000 µg/L;

at least one flavor compound from a fifth group of compounds, the fifth group consisting of cis-oak lactone, eugenol, 4-ethyl-guaiacol, guaiacol, 4-methyl-guaiacol, 4-propyl-guaiacol, 5-pentyldihydrofuran-2 (3H)-one, and 5-hexyldihydrofuran-2(3H)-one, wherein the at least one flavor compound selected from the fifth group is added in an amount ranging from about 0.05 µg/L to about 5,500 µg/L;

at least one flavor compound from a sixth group of compounds, the sixth group consisting of sotolone, methionol, methional, dimethyl sulfide, dimethyltrisulfide, (E)-2-nonenal, (E,E)-2,4-decadienal, and (E,E)-2,4-nonadienal, wherein the at least one flavor compound selected from the sixth group is added in an amount ranging from about 0.02 µg/L to about 70,000 µg/L; and at least one flavor compound from a seventh group of compounds, the seventh group consisting of 4-ethylphenol, p-cresol, m-cresol, o-cresol, and phenol, wherein the at least one flavor compound selected from the seventh group is added in an amount ranging from about 0.1 µg/L to about 5,000 µg/L, wherein the flavor compounds are included in amounts sufficient to form a beverage having the flavor of sherry wine.

32. The flavor system according to claim 31, further including at least one compound selected from an eighth group consisting of acetic acid, tartaric acid, succinic acid, lactic acid, and citric acid, the at least one compound selected from the eighth group being added in an amount ranging from about 4,000 µg/L to about 20,000,000 µg/L.

33. The flavor system according to claim 32, further including at least one compound selected from a ninth group consisting of glycerol, glucose, fructose, L-proline, and saccharose, the at least one compound selected from the ninth group being added in an amount of about 1 µg/L to about 600,000,000 µg/L.

34. The flavor system according to claim 33, further including at least one compound selected from a tenth group consisting of salts of potassium, magnesium, and calcium, the at least one compound being added in an amount ranging from about 2,500 µg/L to about 10,000,000 µg/L.

35. The flavor system according to claim 34, further including at least one compound selected from an eleventh group consisting of tannic acid, aconitic acid, and oak extract, the at least one compound selected from the eleventh group being added in an amount ranging from about 500 µg/L to about 5,000,000 µg/L.

36. A container comprising the flavor system according to claim 31.

* * * * *